United States Patent
Senoo et al.

(10) Patent No.: US 11,198,344 B2
(45) Date of Patent: Dec. 14, 2021

(54) UPPER ARM STRUCTURE OF SUSPENSION DEVICE

(71) Applicant: ISUZU MOTORS LIMITED, Tokyo (JP)

(72) Inventors: Daisuke Senoo, Fujisawa (JP); Atsushi Itou, Fujisawa (JP)

(73) Assignee: ISUZU MOTORS LIMI TED, Tokyo (JP)

( * ) Notice: Subject to any disclaimer, the term of this patent is extended or adjusted under 35 U.S.C. 154(b) by 0 days.

(21) Appl. No.: 16/770,516

(22) PCT Filed: Dec. 6, 2018

(86) PCT No.: PCT/JP2018/044850
§ 371 (c)(1),
(2) Date: Jun. 5, 2020

(87) PCT Pub. No.: WO2019/111987
PCT Pub. Date: Jun. 13, 2019

(65) Prior Publication Data
US 2020/0307331 A1 Oct. 1, 2020

(30) Foreign Application Priority Data

Dec. 8, 2017 (JP) .............................. JP2017-236353

(51) Int. Cl.
*B60G 7/00* (2006.01)
*B60G 7/02* (2006.01)
(Continued)

(52) U.S. Cl.
CPC ............. *B60G 7/001* (2013.01); *B60G 7/008* (2013.01); *B60G 7/02* (2013.01); *B60G 11/08* (2013.01);
(Continued)

(58) Field of Classification Search
CPC .......... B60G 7/001; B60G 7/008; B60G 7/02; B60G 11/08; B60G 13/005; B60G 7/005;
(Continued)

(56) References Cited

U.S. PATENT DOCUMENTS

| 4,570,968 | A |   | 2/1986 | Mukai et al. |
| 5,556,119 | A | * | 9/1996 | Buchner ................ B60G 7/001 |
|           |   |   |        | 280/124.134 |

(Continued)

FOREIGN PATENT DOCUMENTS

| JP | S57126762 A | 8/1982 |
| JP | S59089707 A | 6/1984 |

(Continued)

OTHER PUBLICATIONS

International Search Report and Written Opinion for related PCT App No. PCT/JP2018/044850 dated Jan. 15, 2019, 9 pgs (partial translation).

*Primary Examiner* — Darlene P Condra
(74) *Attorney, Agent, or Firm* — Procopio, Cory, Hargreaves & Savitch LLP

(57) ABSTRACT

A suspension device according to one embodiment of the present disclosure which is equipped with an upper arm which is supported by a knuckle of the vehicle wheel so as to be capable of oscillation, and also supported by a side member which extends in the vehicle front-rear direction so as to be capable of oscillation, wherein: the upper arm has a tip end section positioned at the outside end in the vehicle widthwise direction, and also has arm sections which fork from the tip end section toward the inside in the vehicle widthwise direction; and the upper arm is formed in a manner such that the cross-sectional area of one arm section is greater than the cross-sectional area of the other arm section.

6 Claims, 6 Drawing Sheets

(51) Int. Cl.
  *B60G 11/08* (2006.01)
  *B60G 13/00* (2006.01)
  *B60K 17/06* (2006.01)
(52) U.S. Cl.
  CPC ............ *B60G 13/005* (2013.01); *B60K 17/06* (2013.01); *B60G 7/005* (2013.01); *B60G 2202/114* (2013.01); *B60G 2204/129* (2013.01); *B60G 2204/143* (2013.01); *B60G 2204/148* (2013.01); *B60G 2204/4302* (2013.01); *B60G 2204/45* (2013.01)
(58) Field of Classification Search
  CPC ........ B60G 2202/114; B60G 2204/129; B60G 2204/143; B60G 2204/148; B60G 2204/4302; B60G 2204/45; B60G 13/003; B60G 2206/124; B60G 2300/02; B60G 2206/50; B60G 2204/128; B60G 2204/4502; B60G 2204/121; B60G 2200/144; B60G 7/04; B60G 3/20; B60K 17/06; B62D 21/11
  See application file for complete search history.

(56) References Cited

U.S. PATENT DOCUMENTS

| | | | |
|---|---|---|---|
| 2002/0063408 A1* | 5/2002 | Klais | B60G 11/181 280/124.134 |
| 2003/0168827 A1* | 9/2003 | La | F16F 9/54 280/124.135 |
| 2021/0053408 A1* | 2/2021 | Meyer | B60G 7/001 |

FOREIGN PATENT DOCUMENTS

| | | | |
|---|---|---|---|
| JP | H05058407 A | | 8/1993 |
| JP | 06219165 A | * | 8/1994 |
| JP | H07112607 A | | 5/1995 |
| JP | 09099721 A | * | 4/1997 |
| JP | H11321259 A | | 11/1999 |
| JP | 2000255235 A | | 9/2000 |
| JP | 2013209076 A | | 10/2013 |

* cited by examiner

[FIG.1]
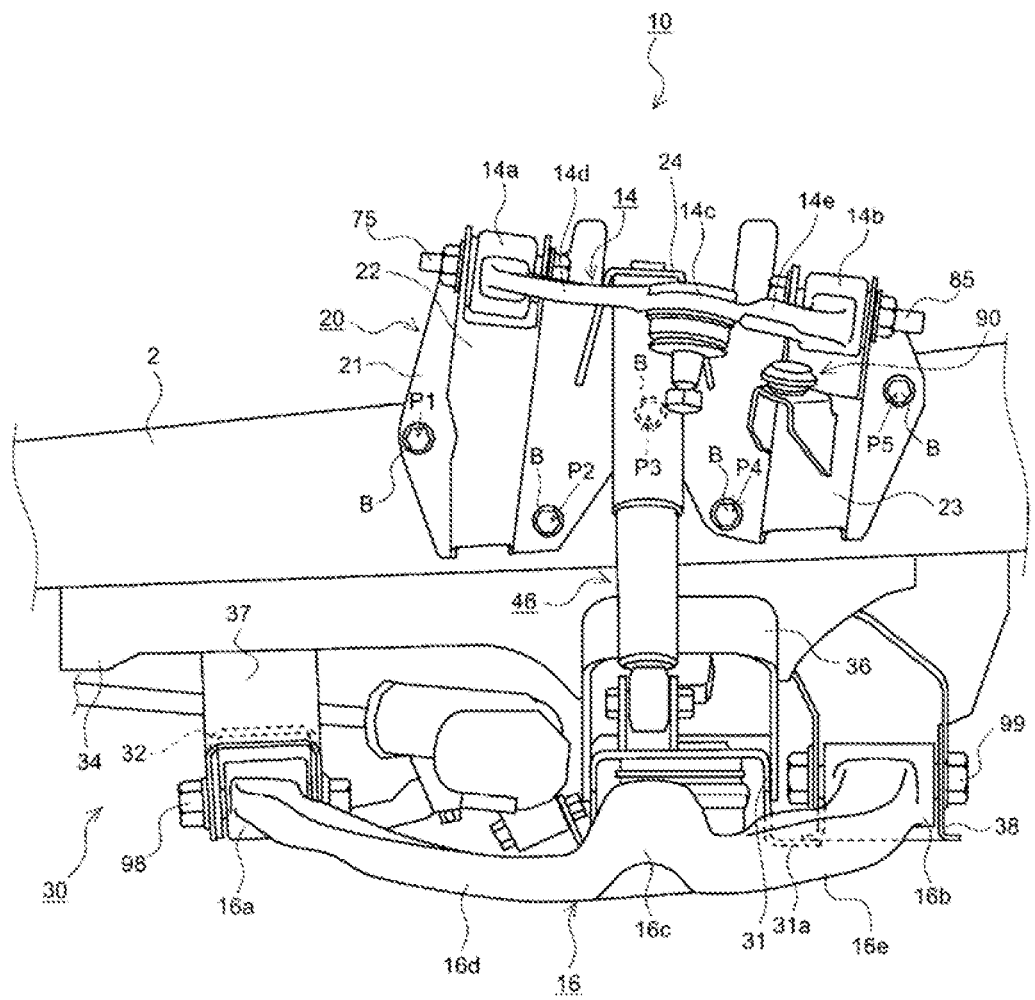

[FIG.2]
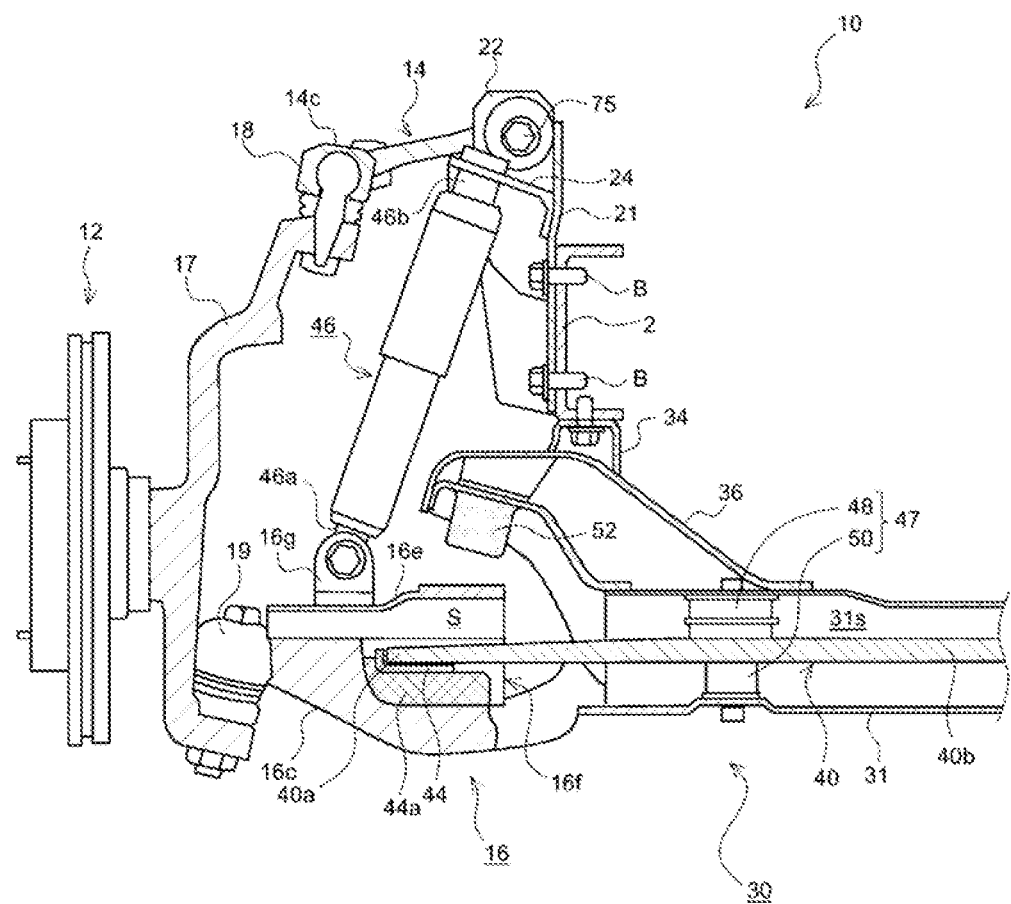

[FIG.3]
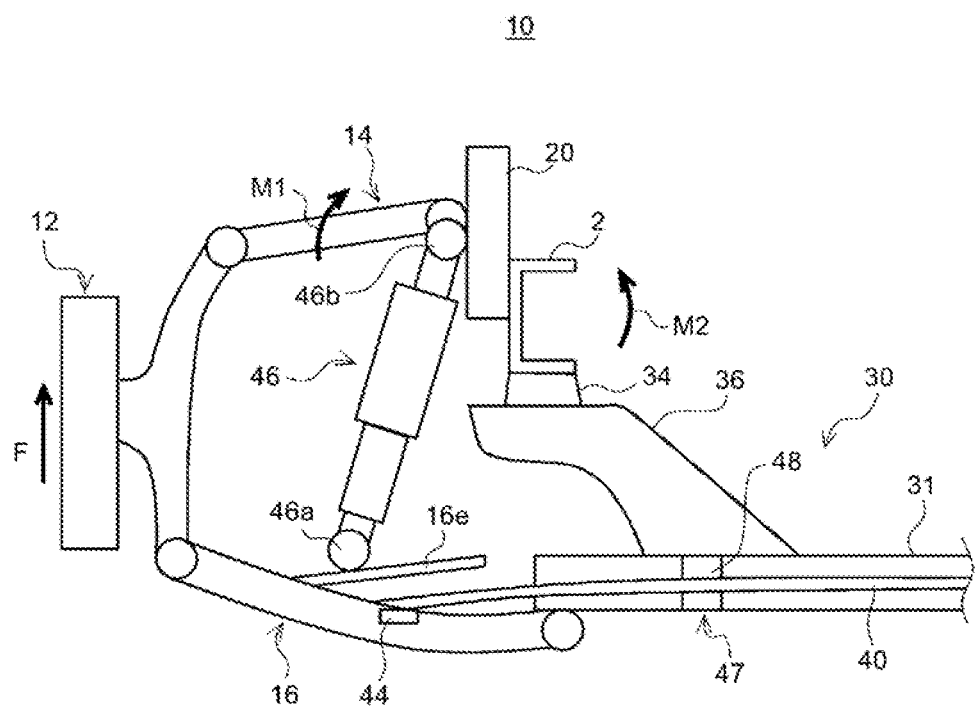

[FIG.4]
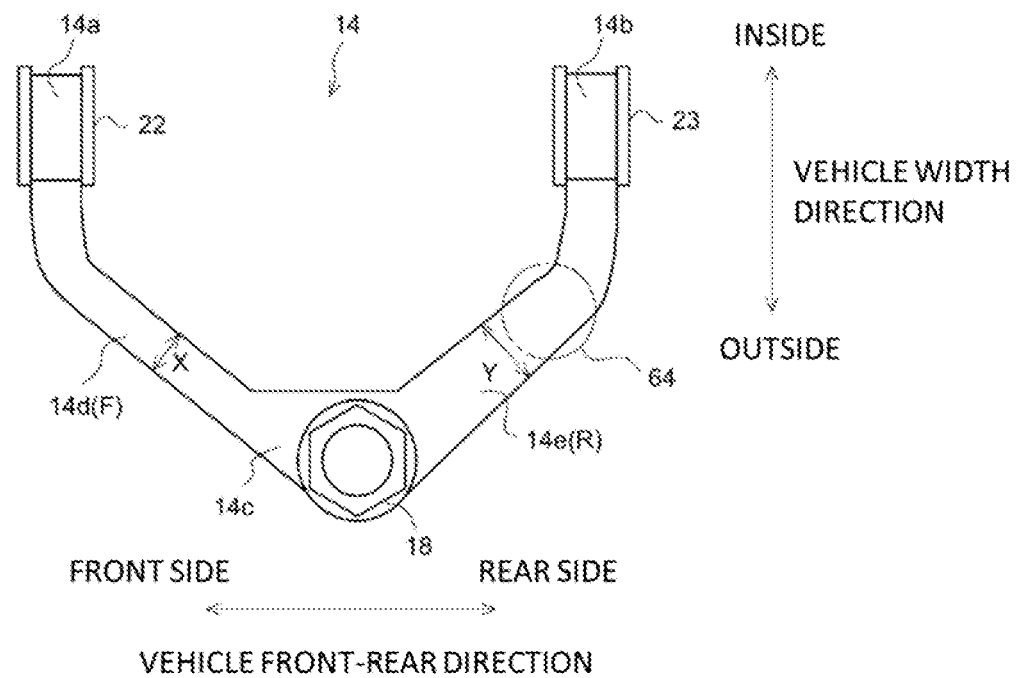

[FIG.5A]
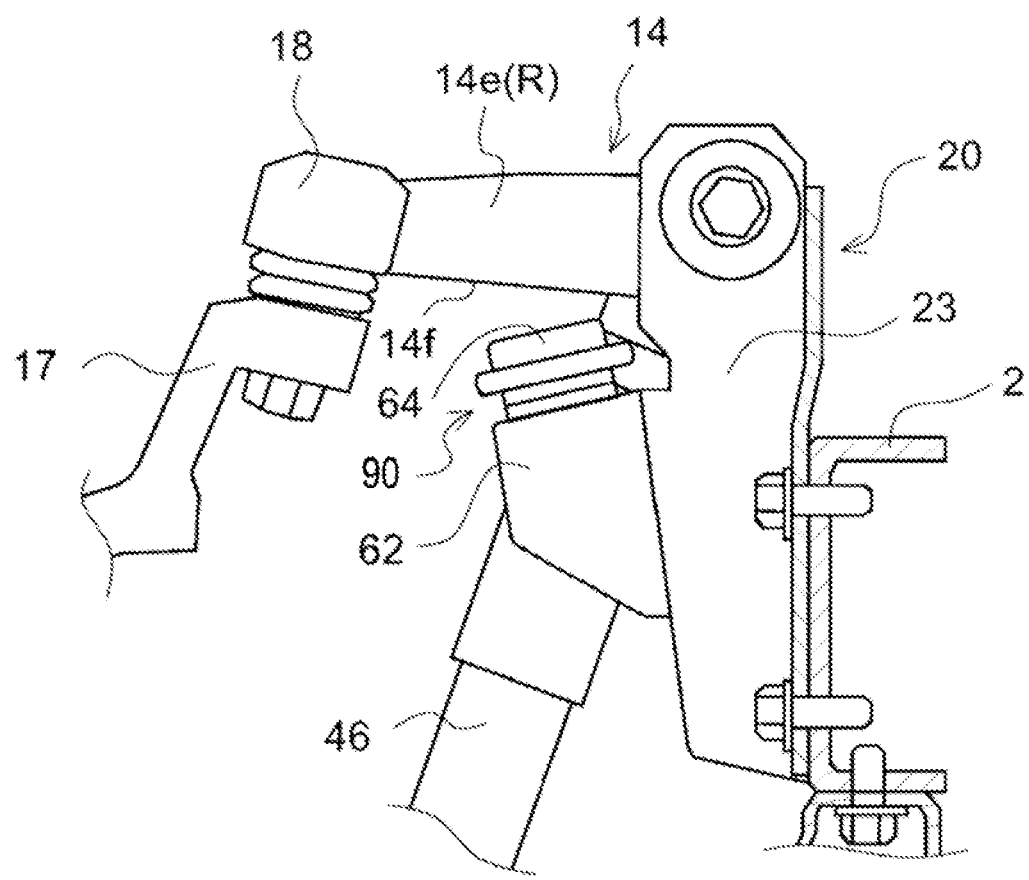

[FIG.5B]
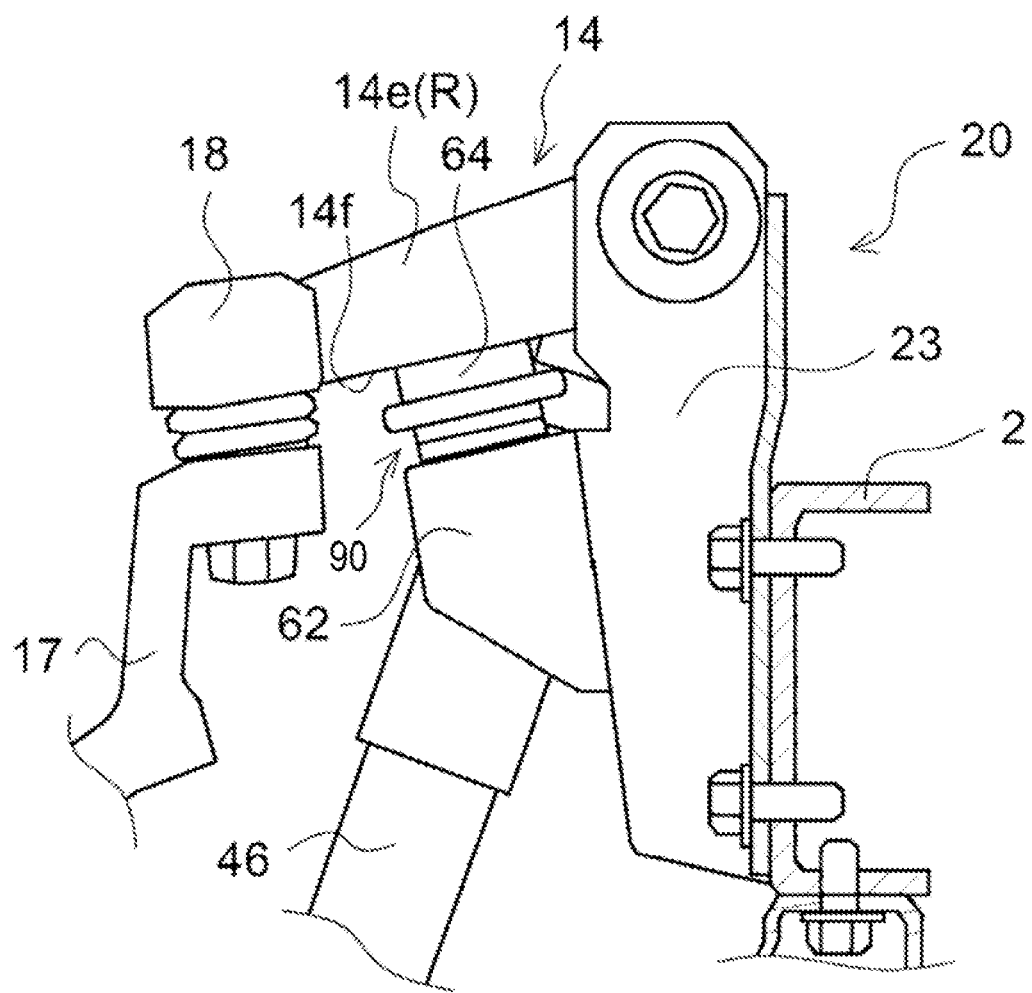

UPPER ARM STRUCTURE OF SUSPENSION DEVICE

CROSS-REFERENCE TO RELATED APPLICATIONS

This application is a U.S. National Stage entry of PCT Application No: PCT/JP2018/044850 filed Dec. 6, 2018, which claims priority to Japanese Patent Application No. 2017-236353 filed Nov. 8, 2017, the contents of which are incorporated herein by reference.

TECHNICAL FIELD

The present disclosure relates to an upper arm structure of a suspension device.

BACKGROUND ART

In a vehicle, a suspension device of a double wishbone type, which is one of independent suspension types for wheels, has been used in the related art. This kind of suspension device includes an upper arm that is swingably supported, by a side member of a vehicle body frame, around a support shaft, and a lower arm that is swingably supported, by a suspension cross member on the vehicle body side, around a support shaft. The upper arm and the lower arm are connected to a knuckle of a wheel.

Patent Literature 1 discloses an example of such a suspension device. The suspension device of Patent Literature 1 includes the upper arm and the lower arm which are connected to a knuckle via a ball joint. Further, the suspension device includes a coil spring provided between the lower arm and a spring receiver fixed to the vehicle body frame, a shock absorber extending to a center of the coil spring, and a leaf spring disposed laterally in a vehicle width direction whose both ends are connected to corresponding lower arms.

CITATION LIST

Patent Literature

Patent Literature 1: JP-A-H7-112607

SUMMARY OF INVENTION

Technical Problem

In the above-described suspension device, when an external force or a shock acting on a wheel is large, it is necessary to increase a dimension of the upper arm and increase the rigidity.

However, when the dimension is increased, the weight and the manufacturing cost are increased, and the layout of other members is limited, causing a decrease in a degree of freedom in design.

An object of a technology of the present disclosure is to provide a suspension device that can achieve both the high rigidity and the weight reduction and has a high degree of freedom in design.

Solution to Problem

To achieve the above object, a technology of the present disclosure provides an upper arm structure of a suspension device including: an upper arm configured to be swingably supported by a knuckle of a wheel, the upper arm being configured to be swingably supported by a side member extending in a vehicle front-rear direction, in which the upper arm includes: a distal end portion located at an end portion on an outside in the vehicle width direction; and arm portions bifurcated, from the distal end portion, inward in the vehicle width direction, and in which a cross-sectional area of one arm portion of the bifurcated arm portions is larger than a cross-sectional area of the other arm portion.

A base end portion of each arm portion may be configured to be swingably supported by a bracket connected to the side member, and a rebound stopper may be provide below the one arm portion in a vertical direction, the rebound stopper being abuttable against the one arm portion during swinging.

The one arm portion may be an arm portion on a rear side in the vehicle front-rear direction.

Further, the suspension device may include: the upper arm structure; a lower arm configured to be swingably supported by the knuckle, the lower arm being configured to be swingably supported by a suspension cross member extending in the vehicle width direction; a shock absorber provided between the lower arm and the side member; a leaf spring disposed laterally in the vehicle width direction, the leaf spring having an end portion disposed in the lower arm; a transmission unit configured to transmit a force from the leaf spring to the suspension cross member; and a connection member configured to connect the suspension cross member to the side member, in which the shock absorber is configured to exert a force to the side member from an outside of the vehicle, and the transmission unit may be positioned on an inside of the vehicle relative to the side member.

Advantageous Effects of Invention

The above technology of the present disclosure can provide a suspension device that can achieve both high rigidity and the weight reduction and has a high degree of freedom in design since the suspension device has the above configuration.

BRIEF DESCRIPTION OF DRAWINGS

FIG. 1 is a schematic configuration view of a part of a suspension device according to the present embodiment.

FIG. 2 is a configuration view of the suspension device of FIG. 1 on one wheel side, and is a partial cross-sectional view.

FIG. 3 is a schematic diagram for showing operation and effects of the suspension device of FIG. 1.

FIG. 4 is a plan view of an upper arm of the suspension device of FIG. 1.

FIG. 5A is an enlarged view illustrating operation of a rebound stopper, and is a view illustrating a state where the rebound stopper does not in contact with an upper arm.

FIG. 5B is an enlarged view illustrating operation of the rebound stopper, and is a view illustrating a state where the rebound stopper is in contact with the upper arm.

DESCRIPTION OF EMBODIMENTS

The present embodiment will be described below with reference to the accompanying drawings. The same components or configurations are denoted by the same reference numerals, and names and functions thereof are also the same. Therefore, detailed descriptions of the same components are not repeated.

[Overall Configuration of Suspension Device]

FIG. 1 is a schematic side view of a suspension device 10 according to the present embodiment as viewed from a left side of a vehicle body. The suspension device 10 is suspension device of a so-called independent suspension type and is applied to left and right front wheels (not illustrated) of the vehicle 1 in the present embodiment. Specifically, the suspension device 10 includes an upper bracket 20 fixed to a side member 2 extending in a front-rear direction of a vehicle body (illustration of a right side member is omitted), an upper arm 14 and a lower arm 16 that are swingable with respect to the vehicle body, a lower frame body 30 provided below the side member 2, and a shock absorber 46 as a shock absorbing device. Since the suspension device 10 has a substantially symmetrical configuration when applied to the left front wheel and the right front wheel, a configuration applied to the left front wheel will be described below, and a description of a configuration applied to the right front wheel will be substantially omitted.

The upper bracket 20 includes a plate-shaped main body portion 21 fixed to a wall surface on an outside of the side member 2 in a width direction of a vehicle body, a front upper arm bracket portion 22 provided to a front end side of the main body portion 21 in the front-rear direction of the vehicle body, a rear upper arm bracket portion 23 provided to a rear end side of the main body portion 21 in the front-rear direction of the vehicle body, an intermediate bracket portion 24 disposed between the upper arm brackets 22 and 23 of the main body portion 21, and a rebound stopper 90 provided to the rear upper arm bracket portion 23.

In the present embodiment, the upper bracket 20 is preferably configured such that a total five locations including a first position P1 of the main body portion 21 frontward than the front upper arm bracket portion 22, a second position P2 of the main body portion 21 between the front upper arm bracket portion 22 and the intermediate bracket portion 24, a third position P3 of the main body portion 21 downward than the intermediate bracket portion 24, a fourth position P4 of the main body portion 21 between the intermediate bracket portion 24 and the rear upper arm bracket portion 23, and a fifth position P5 of the main body portion 21 rearward than the rear upper arm bracket portion 23 are fixed by fastening bolts B to back nuts (not illustrated) of the side member 2. A detailed configuration of the upper bracket 20 will be described below.

The upper arm 14 is formed in a substantial V shape or a substantial A shape. The upper arm 14 includes a pair of front and rear upper arm base end portions 14a and 14b that are spaced apart in the front-rear direction of the vehicle body, an upper arm distal end portion 14c located outward than the front and rear upper arm base end portions 14a and 14b in the width direction of the vehicle body, and a pair of front and rear arm portions 14d and 14e that connect these front and rear upper arm base end portions 14a and 14b to the upper arm distal end portion 14c, respectively. The front and rear upper arm base end portions 14a and 14b are formed in a substantially cylindrical shape, and are swingably and pivotally supported by the front and rear upper arm bracket portions 22 and 23 via cam bolts 75 and 85. The details of these support structures will be described below.

The lower arm 16 is formed in a substantial V shape or a substantial A shape. The lower arm 16 includes a pair of front and rear lower arm base end portions 16a and 16b that are spaced apart in the front-rear direction of the vehicle body, a lower arm distal end portion 16c located outward than the front and rear lower arm base end portions 16a and 16b in the width direction of the vehicle body, and a pair of front and rear arm portions 16d and 16e that connect these front and rear lower arm base end portions 16a and 16b to the lower arm distal end portion 16c, respectively. The front and rear lower arm base end portions 16a and 16b are formed in a substantially cylindrical shape, and are rotatably and pivotally supported by front and rear lower arm bracket portions 37 and 38, which will be described below, via bolts 98 and 99.

As illustrated in FIG. 2, an upper end portion of a knuckle 17 of a hub of the wheel (not illustrated) or a brake rotor (hereinafter, simply referred to as a hub) 12 is pivotally supported by the upper arm distal end portion 14c of the upper arm 14 via a ball joint 18, and a lower end portion of the knuckle 17 of the hub 12 is pivotally supported by the lower arm distal end portion 16c of the lower arm 16 via a ball joint 19.

Returning to FIG. 1, the lower frame body 30 includes a pair of front and rear main cross members 31 extending substantially parallel to each other in the width direction of the vehicle body, a sub-cross member 32, a pair of left and right vertical members 34 (illustration of the right vertical member is omitted) extending substantially parallel to each other in the front-rear direction of the vehicle body, and a lower bracket 36. The sub-cross member 32 is spaced apart from the main cross member 31 in front of the main cross member 31.

An upper surface of the vertical member 34 is arranged along a lower surface of the side member 2, and the vertical member 34 is joined to the side member 2 by a bolt nut which is not illustrated (or welding, etc.). The vertical member 34 straddles an upper portion of the lower bracket 36. An upper end portion of a front lower arm bracket 37, which will be described below, is joined to a lower surface on a front end side of the vertical member 34 by welding or the like. The sub-cross member 32 is connected to and supported by the vertical member 34 via the front lower arm bracket 37. The lower bracket 36 is joined to a lower surface on a rear end side of the vertical member 34 by welding or the like, and an upper surface portion on an outside of the main cross member 31 in the width direction of the vehicle body is joined to a lower end of the lower bracket 36 by welding or the like. That is, the lower bracket 36 functions as a connection member connecting the vertical member 34 and the main cross member 31.

Further, the lower frame body 30 includes a pair of front and rear lower arm brackets 37 and 38 disposed in the front-rear direction of the vehicle body. A front lower arm base end portion 16a of the lower arm 16 is swingably and pivotally supported by the front lower arm bracket 37 via the bolt 98. A rear lower arm base end portion 16b of the lower arm 16 is swingably and pivotally supported by the rear lower arm bracket 38 via the bolt 99. An upper end of the front lower arm bracket 37 is joined to the vertical member 34 by welding or the like, and a lower end portion thereof is provided with a recessed portion that opens downward substantially in a U shape. The sub-cross member 32 is fitted into the recessed portion and fixed thereto by welding or the like. A front end side of the rear lower arm bracket 38 is fixed to an extension portion 31a of the main cross member 31 by welding or the like, and an upper end side thereof is fixed to the vertical member 34 via welding or the like.

As illustrated in FIG. 2, in the suspension device 10 of the present embodiment, a leaf spring 40 is inserted into an inner cavity 31s of the main cross member 31 and is disposed laterally in the width direction of the vehicle body. The leaf spring 40 has a shape that generally extends in the width direction of the vehicle body and is curved to slightly protrude upward in the vertical direction. One end portion 40a of the leaf spring 40 is disposed on a support portion 44 in the lower arm 16 on the hub 12 side that is the left front wheel side, and the other end portion of the leaf spring 40 is similarly disposed on a support portion in the lower arm on the right front wheel side (not illustrated). An intermediate part 40b of the leaf spring 40 is accommodated in the inner cavity 31s of the main cross member 31, and is supported by the main cross member 31 via a bushing member 47.

The support portion 44 is accommodated in a space S defined by the lower arm distal end portion 16c of the lower arm 16 and a lower arm cover portion 16e covering an upper surface of the lower arm distal end portion 16c. An elastic body 44a is provided on a lower side of the support portion 44. The elastic body 44a has a function of increasing buffering capacity when a large force acts on the support portion 44, or absorbing a difference between a rotation trajectory of the lower arm 16 and a rotation trajectory of the leaf spring 40. The lower arm 16 in which the cover portion 16e is attached to the upper surface of the lower arm distal end portion 16c includes an opening portion 16f opening inward in the vehicle width direction. The one end portion 40a of the leaf spring 40 extends into the space S through the opening portion 16f, and is supported by the support portion 44.

The bushing member 47 includes an upper bushing 48 located on a vertically upper side of the leaf spring 40 and connected to an upper inner peripheral surface of the main cross member 31, and a lower bushing 50 located on a vertically lower side of the leaf spring 40 and connected to a lower inner peripheral surface of the main cross member 31. The intermediate part 40b of the leaf spring 40 is supported by an inner peripheral surface of the main cross member 31 via a pair of left and right bushing members 47 (illustration of the right bushing member is omitted) disposed in the inner cavity 31s in the width direction of the vehicle body. The leaf spring 40 is pressed against the support portion 44 of the lower arm 16 by the upper bushing 48. The upper bushing 48 transmits a force from the leaf spring 40 to the lower frame body 30. The lower bushing 50 is provided with respect to the leaf spring 40 so as to function as, for example, a stabilizer. In this way, by providing the upper bushing 48 and the lower bushing 50, the leaf spring 40 is curved in a substantial S shape when forces different in an upper-lower direction act on left and right front wheels, so that the forces act on both the left and right front wheels, for example.

The shock absorber 46 extends obliquely between the lower arm 16 and the side member 2. A lower end portion 46a of the shock absorber 46 is supported, via a bolt nut or the like, by a support bracket 16g fixed to the upper surface of the lower arm cover portion 16e by welding or the like. An upper end portion 46b of the shock absorber 46 is supported by the intermediate bracket portion 24 of the upper bracket 20.

[Operation and Effects of Overall Suspension Device]

The suspension device 10 described in detail above has a configuration in which the upper bracket 20 fixed to a wall surface of the side member 2 on an outside in the vehicle width direction is independent of the lower frame body 30 fixed to a wall surface of the side member 2 on a lower side in the upper-lower direction of the vehicle body. As a result, the suspension device 10 of the present embodiment can have a high degree of freedom in design.

The suspension device has a configuration in which the upper bracket 20 and the lower frame body 30 are independent of each other, so that the upper bracket 20 and the lower frame body 30 can be assembled with the side member 2 separately, and particularly, the assemblability of the lower frame body 30, among constituent elements of the suspension device 10, to the side member 2 can be improved.

The suspension device 10 is also excellent in the strength and the rigidity. Specifically, as shown in FIG. 3, the one end portion 46a of the shock absorber 46 is connected to the lower arm 16, and the other end portion 46b of the shock absorber 46 is connected to the upper bracket 20. A connection portion of the shock absorber 46 to the lower arm 16 is located outward than the upper bracket 20 in the width direction of the vehicle body. Then, the upper bracket 20 is fixed to the wall surface of the side member 2 on the outside in the width direction of the vehicle body. Therefore, the shock absorber 46 can exert a force to the side member 2 from the outside in the width direction of the vehicle body to the inside (hereinafter, such a force transmission path is referred to as a first transmission route). In addition, a force transmitted from the leaf spring 40 via the upper bushing 48, the main cross member 31, the lower bracket 36, and the vertical member 34 acts on the side member 2 (hereinafter, such a force transmission path is referred to as a second transmission route).

In the suspension device 10, for example, when a force F is applied to lift the hub 12 upward in the vertical direction, a moment M1 of the first transmission route acts on the side member 2. On the other hand, when the force is transmitted from the lower arm 16 to the leaf spring 40, an elastic force of the leaf spring 40 is transmitted to the main cross member 31 via the upper bushing 48. Since the lower bracket 36 is disposed on a lower side of the side member 2 in the upper-lower direction of the vehicle body, a moment M2 of the second transmission route acts on the side member 2. These moments M1 and M2 act to cancel each other out. Therefore, according to the suspension device 10 of the present embodiment, it is possible to reliably ensure the rigidity with respect to the force F without increasing the thickness of the side member 2, and to effectively prevent a weight increase and a structural change accompanied thereby.

[Upper Arm]

Next, the structure of the upper arm 14 in the suspension device 10 will be described in detail with reference to FIG. 4.

The upper arm 14 includes the upper arm distal end portion 14c connected to the ball joint 18, the arm portions 14d and 14e bifurcated from the upper arm distal end portion 14c, and the front and rear arm base end portions 14a and 14b respectively connected to the front and rear upper arm bracket portions 22 and 23 provided at end portions, opposite to the upper arm distal end portion 14c, of the arm portions 14d and 14e. Here, when a width (thickness) of the front arm portion 14d (F) on the front side in a vehicle front-rear direction is set as X and a width (thickness) of the rear arm portion 14e (R) on the rear side is set as Y, the width Y of the rear arm portion 14e (R) is larger than the width X of the front arm portion 14d (F). As a result, a cross-sectional area of the rear arm portion 14e (R) is larger than a cross-sectional area of the front arm portion 14d (F). An abutting portion 64 of a rebound stopper, which will be described below, is disposed below the rear arm portion 14e (R) in a vertical direction.

[Rebound Stopper]

As illustrated in FIG. 1, a rebound stopper 90 is provided to the rear upper arm bracket portion 24 of the upper bracket 20. The rebound stopper includes a lateral bracket 62 fixed to the rear upper arm bracket portion 24, and the abutting portion 64 provided on a top surface 62a of the lateral bracket 62 and abuttable against a back surface 14f of the rear arm portion 14e (R). The abutting portion 64 is disk-shaped, and is formed of, for example, an elastic body such as rubber, and any shape and material of the abutting portion 64 may be used as long as the abutting portion 64 is a structure capable of absorbing shock during the abutting with the back surface 14f.

FIGS. 5A and 5B are enlarged views illustrating operation of the rebound stopper 90. During normal travelling of a vehicle, as illustrated in FIG. 5A, the abutting portion 64 of the rebound stopper 90 is in a non-contact state with the back surface (lower surface) 14f of the rear arm portion 14e (R). However, when the wheel went down on a bad road, the lower surface 14f of the rear arm portion 14e (R), which is swingably provided by the ball joint 18, is lowered via the knuckle 17. Therefore, as illustrated in FIG. 5B, the abutting portion 64 of the rebound stopper 90 is in surface contact with the lower surface 14f of the rear arm portion 14e (R). As a result, energy at the time of the collision is absorbed by the elastic member of the abutting portion 64, and the shock absorber 46 is prevented from overextending and the wheel does not fall too much.

[Effects of Upper Arm and Rebound Stopper]

In the present embodiment, in the upper arm 14, the width of the rear arm portion 14e (R) is large to ensure the rigidity of the overall upper arm 14, and the width of the front arm portion 14d (F) is small to reduce the weight of the overall upper arm 14. In addition, the width of the front arm portion 14d (F) is small, so that a clearance can be generated in the space on the front side in the vehicle front-rear direction, a degree of freedom in the layout of the other members can be increased, and a steering angle can be ensured to be large.

On the other hand, the width of the rear arm portion 14e (R) is large to increase the rigidity, so that the rear arm portion 14e (R) can be prevented from being damaged due to the shock at the time of collisions even if the rebound stopper 60 is provided below the rear arm portion 14e (R) in the vertical direction.

Although the representative embodiment of the present invention has been described above, the present invention can be modified in various ways. Various substitutions and changes are possible without departing from the spirit and scope of the invention as defined by the claims of the present application.

For example, in the above embodiment, the upper arm 14 and the shock absorber 46 are connected to the single upper bracket 20. However, the upper bracket 20 is not limited to being a single member, but may include two or more independent members, or even members separately arranged. For example, the upper bracket 20 may include two separated upper arm brackets for connecting the upper arm, and a bracket for connecting the shock absorber, which is provided between the two separated upper arm brackets.

In the above embodiment, the width (thickness) of the rear arm portion 14e (R) is larger than the width (thickness) of the front arm portion 14d (F). However, a reverse configuration, that is, a configuration in which the width (thickness) of the front arm portion 14d (F) may be larger than the width (thickness) of the rear arm portion 14e (R) may be used. Further, the number of the arm portions 14d and 14e is two in the above embodiment, but the number thereof may be three or more. In that case, when the arm portions can be classified into two groups: a front group and a rear group, a total width (thickness) of arm portions in one group is larger than that of the other group, which is contained in the present invention.

The present application is based on a Japanese Patent Application (Japanese Patent Application No. 2017-236353), filed on Dec. 8, 2017, the contents of which are incorporated herein by reference.

INDUSTRIAL APPLICABILITY

The present disclosure has an effect of being able to providing a suspension device that can achieve both high rigidity and the weight reduction and has a high degree of freedom in design, and is useful to contribute to the realization of a vehicle excellent in safety and traveling performances.

DESCRIPTION OF REFERENCE NUMERALS

10 Suspension device
14 Upper arm
14a, 14b Base end portion
14c Distal end portion
14d (F) Front arm portion
14e (R) Rear arm portion
16 Lower arm
20 Upper bracket
21 Main body portion
22 Front upper arm bracket portion
23 Rear upper arm bracket portion
24 Intermediate bracket portion
30 Lower frame body
31 Main cross member
32 Sub-cross member
34 Vertical member
36 Lower bracket (connection member)
40 Leaf spring
46 Shock absorber
48 Upper bushing (transmission unit)
90 Rebound stopper
62 Lateral bracket
64 Abutting portion

The invention claimed is:

1. An upper arm structure of a suspension device, the upper arm structure comprising:
an upper arm configured to be swingably supported by a knuckle of a wheel, the upper arm being configured to be swingably supported by a side member extending in a vehicle front-rear direction,
the upper arm including:
a distal end portion located at an end portion on an outside in the vehicle width direction; and
arm portions bifurcated, from the distal end portion, inward in the vehicle width direction, wherein a cross-sectional area of one arm portion of the bifurcated arm portions is larger than a cross-sectional area of the other arm portion of the bifurcated arm portions;
a bracket configured to be connected to the side member and to support a base end portion of each arm portion such that each arm portion is swingable; and
a rebound stopper provided below the one arm portion in a vertical direction, the rebound stopper being abuttable against the one arm portion during swinging,
wherein the rebound stopper and the one arm portion are fixed to the same bracket.

2. The upper arm structure of the suspension device according to claim 1,
   wherein the one arm portion is an arm portion on a rear side in the vehicle front-rear direction.

3. The suspension device comprising:
   the upper arm structure according to claim 1;
   a lower arm configured to be swingably supported by the knuckle, the lower arm being configured to be swingably supported by a suspension cross member extending in the vehicle width direction;
   a shock absorber provided between the lower arm and the side member;
   a leaf spring disposed laterally in the vehicle width direction, the leaf spring having an end portion disposed on the lower arm;
   a transmission unit configured to transmit a force from the leaf spring to the suspension cross member; and
   a connection member configured to connect the suspension cross member to the side member,
   wherein the shock absorber is configured to exert a force to the side member from an outside of the vehicle, and
   wherein the transmission unit is positioned on an inside of the vehicle relative to the side member.

4. The suspension device according to claim 3,
   wherein the transmission unit is connected to an upper surface of the leaf spring and an upper inner peripheral surface of the suspension cross member.

5. The upper arm structure of the suspension device according to claim 1,
   wherein, when viewed from the vertical direction, the rebound stopper has a region that overlaps with the one arm portion and a region that does not overlap with the one arm portion.

6. The upper arm structure of the suspension device according to claim 1,
   wherein the rebound stopper includes a lateral bracket fixed to the bracket, and an abutting portion provided on a top surface of the lateral bracket and abuttable against a bottom surface of the one arm portion.

* * * * *